United States Patent [19]

Wong

[11] Patent Number: 5,510,972

[45] Date of Patent: Apr. 23, 1996

[54] BRIDGE RECTIFIER CIRCUIT HAVING ACTIVE SWITCHES AND AN ACTIVE CONTROL CIRCUIT

[75] Inventor: Stephen Wong, Scarsdale, N.Y.

[73] Assignee: Philips Electronics North America Corporation, New York, N.Y.

[21] Appl. No.: 268,705

[22] Filed: Jun. 29, 1994

[51] Int. Cl.$^6$ .................................................. H02M 7/217
[52] U.S. Cl. ............................................ 363/127; 363/125
[58] Field of Search ..................................... 363/127, 128, 363/147, 123, 125, 126, 181, 84, 89; H02M 7/217

[56] References Cited

U.S. PATENT DOCUMENTS

| | | | |
|---|---|---|---|
| 3,883,701 | 5/1975 | Zelina et al. | 321/5 |
| 4,473,757 | 9/1984 | Farago et al. | 307/127 |
| 4,535,203 | 8/1985 | Jenkins et al. | 179/81 |
| 4,590,547 | 5/1986 | Goinga | 363/127 |
| 4,618,922 | 10/1986 | Hartranft et al. | 363/127 |
| 4,716,514 | 12/1987 | Patel | 363/127 |
| 4,777,580 | 10/1988 | Bingham | 363/127 |
| 4,819,147 | 4/1989 | Bingham | 363/127 |
| 4,866,585 | 9/1989 | Das | 363/8 |
| 4,922,404 | 5/1990 | Ludwig et al. | 363/89 |
| 5,055,994 | 10/1991 | Schoofs | 363/127 |
| 5,103,389 | 4/1992 | Kleffstra et al. | 363/127 |

FOREIGN PATENT DOCUMENTS

| | | | |
|---|---|---|---|
| 0112119 | 6/1984 | European Pat. Off. . | |
| 63-64572 | 2/1988 | Japan . | |
| 2131635 | 6/1984 | United Kingdom | 363/127 |
| 85/01161 | 3/1985 | WIPO | 363/127 |

OTHER PUBLICATIONS

"MOSFETs Move in on Low Voltage Rectification", R. Blanchard, Director of Engineering and R. Severns, Sr. Staff Engineer, Central Applications, PCI Oct. 1984 Proceedings, pp. 213–222.

Primary Examiner—Peter S. Wong
Assistant Examiner—Adolf Berhane
Attorney, Agent, or Firm—Steven R. Biren

[57] ABSTRACT

A bridge rectifier circuit uses active switches for at least two of its four rectifying elements, and employs an active control circuit to control the state of the active switches. The active control circuit receives its input from the AC input to the bridge rectifier circuit, is powered by the DC output of the bridge rectifier circuit, and provides control outputs to the active switches. In this manner, a bridge rectifier circuit having improved performance and decreased power dissipation is achieved.

7 Claims, 2 Drawing Sheets

BRIDGE RECTIFIER CIRCUIT HAVING ACTIVE SWITCHES AND AN ACTIVE CONTROL CIRCUIT

BACKGROUND OF THE INVENTION

This invention is in the field of bridge rectifier circuits, and relates more particularly to bridge rectifier circuits having active switching elements.

Typical prior-art bridge rectifier circuits use four diodes in a bridge configuration having two AC input terminals and two DC output terminals, and serve to convert an AC input voltage into a DC output voltage. Perhaps the most common use of such bridge rectifier circuits is to convert an AC input voltage derived a power line into a DC voltage which is subsequently filtered and used to power electronic circuits.

Although the simple four-diode bridge rectifier circuit performs its intended function adequately, it does suffer from a number of drawbacks, particularly in high-current applications. Because of the inherent forward voltage drop (typically 0.7 volts or higher) across each diode, significant amounts of power can be dissipated in the bridge, particularly when large currents are involved. This unwanted power dissipation requires the use of larger components and generates unwanted heat, drawbacks that are particularly bothersome in integrated circuit applications.

To overcome these drawbacks, prior-art bridge rectifier circuits were developed in which MOS transistors were used to replace at least two of the diodes in a conventional bridge rectifier circuit. The advantage of using transistors instead of diodes in this application is that an MOS transistor, when turned on, provides a substantially lower voltage drop (in the order of 0.2–0.3 volts) thus reducing power dissipation and heat generation as compared to diode rectifiers.

When MOS transistors are used as rectifying elements, however, additional circuitry must be provided to turn the transistors on or off at the appropriate times. In the prior art, this function is accomplished by connecting the gates of the MOS transistors (either directly or through a network of passive components) to the AC input voltage terminals, thus providing a simple and reasonably effective source of control voltage to appropriately switch the MOS transistors. However, since this technique results in a sinusoidal control voltage, with a slow transition from low to high voltage, the MOS transistors will not be efficiently switched, and will be only partially on during a significant portion of the duty cycle. This results in a relatively high on resistance during this portion of the duty cycle, thus resulting in higher power dissipation and substantially reducing the advantage achieved by substituting MOS transistors for diodes as rectifying elements. Furthermore, the variable resistance of the MOS transistors may result in undesirable "glitches" in the output waveform when the circuits are required to carry large currents.

Accordingly, it would be desirable to have a bridge rectifier circuit in which voltage drop, power dissipation, heat generation and output waveform "glitches" are all minimized.

SUMMARY OF THE INVENTION

It is thus an object of the invention to provide a bridge rectifier circuit having active switches such as MOS transistors, in which an active control circuit is used for greater switching efficiency, in order to minimize power dissipation, heat generation, voltage drop and undesirable "glitches" in the output waveform.

It is a further object of the invention to provide a bridge rectifier circuit having the aforementioned advantages which is relatively simple and compact in design, and relatively economical to manufacture.

In accordance with the invention, these objects are achieved by a new bridge rectifier circuit in which at least two of the rectifying elements are active switches, and in which an active control circuit is provided for controlling the state of these active switches. The control circuit receives its input from the AC input terminals of the bridge, provides control outputs to the active switches, and is powered from the DC output terminals of the bridge.

In a preferred embodiment of the invention, the two rectifying elements of the bridge rectifier circuit which are at the lower DC potential are provided as MOS transistors, with the control circuit outputs being provided to the gates of these MOS transistors.

In a further preferred embodiment of the invention, the control circuit is composed of a comparator circuit for sensing the level of at least one of the AC input terminals with respect to a reference voltage, such as the lower DC potential. The comparator circuit can be formed of a bipolar transistor having a main current path coupled between the DC output terminals of the bridge rectifier circuit and a control electrode coupled to one of the control inputs by a diode.

When the bridge rectifier circuit of the invention is used in high-voltage applications, a voltage regulator circuit may advantageously be provided to supply a regulated DC voltage derived from the DC output terminals to the comparator circuit.

BRIEF DESCRIPTION OF THE DRAWING

The invention may be more completely understood with reference to the following detailed description, to be read in conjunction with the accompanying drawing, in which.

DESCRIPTION OF THE PREFERRED EMBODIMENTS

Figure 1:
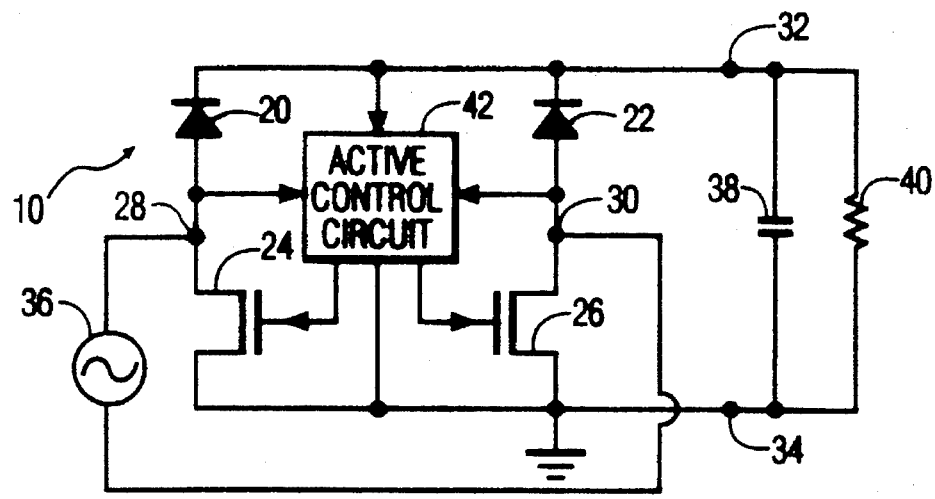
FIG. 1 shows a partially-schematic and partially block diagram of a bridge rectifier circuit in accordance with the invention.

A bridge rectifier circuit 10 in accordance with the invention is shown in partly-schematic and partly-block diagram form in FIG. 1. The bridge rectifier circuit includes four rectifier elements 20, 22, 24 and 26 connected in a bridge configuration between AC input terminals 28, 30 and DC output terminals 32, 34. An AC input signal source 36, typically an AC mains or line voltage input, is applied across the AC input terminals 28 and 30, and a filter capacitor 38 and resistive load 40 are typically connected across the DC output terminals 32 and 34.

In accordance with the invention, two of the rectifying elements, in this case elements 24 and 26 coupled to the lower DC potential at the DC output terminal 34, are MOS transistors rather than conventional diodes such as rectifying elements 20 and 22.

Since MOS transistors 24 and 26 (unlike diodes 20 and 22) require control signals to set their states, in accordance with the invention an active control circuit 42 is provided for this purpose. Control circuit 42, shown in FIG. 1 in block-diagram form, derives its inputs from AC input terminals 28 and 30, and provides control output signals to MOS transistors 24 and 26, which serve as active switches in the bridge rectifier circuit. Unlike prior-art circuits, which use either direct connections or passive components to couple the AC input signals to the active switches, control circuit 42 is an active circuit which serves to process the AC input signals, and which utilizes a feedback arrangement to derive its power from the DC output terminals 32 and 34. By using an active control circuit, powered from the DC output terminals, a substantial improvement in circuit performance is obtained.

Figure 2:
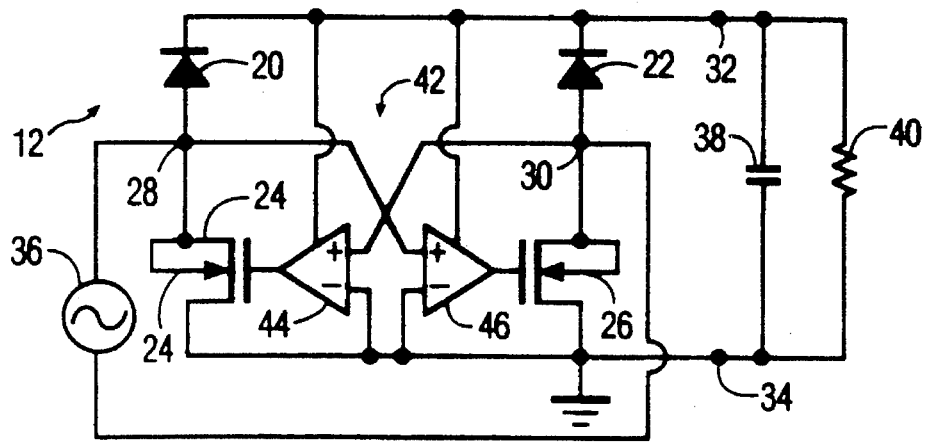
FIG. 2 shows a schematic diagram of a bridge rectifier circuit in accordance with a first embodiment of the invention.
Figure 3:
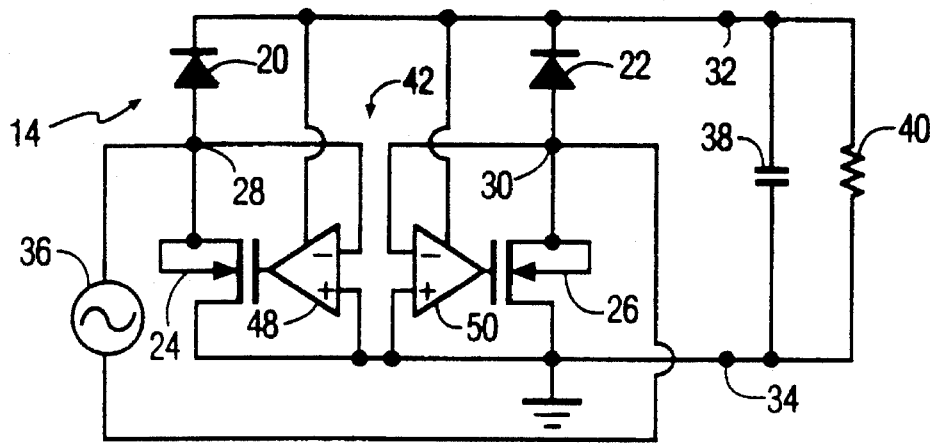
FIG. 3 shows a bridge rectifier circuit in accordance with a second embodiment of the invention.

It will be recognized that the control circuit of the present invention can be embodied in various different forms, and that all four rectifier elements in the bridge may be composed of active switches such as MOS transistors 24 and 26, in which case active control circuit 42 would provide inputs to all four rectifier elements. For purposes of illustration, two specific control circuit embodiments are shown in FIGS. 2 and 3, with further circuit details being shown in FIGS. 4, 5 and 6. In FIGS. 2 and 3, components which duplicate those shown in FIG. 1 are provided with like reference numerals.

FIG. 2 shows a first embodiment of a bridge rectifier circuit 12 in accordance with the invention in which the active control circuit 42 comprises a pair of comparator circuits 44 and 46. Comparator circuit 44 has its noninverting input terminal coupled to AC input terminal 30 and its inverting input terminal coupled to DC output terminal 34 (ground), and provides a control signal to MOS transistor 24. Similarly, comparator circuit 46 receives its noninverting input from AC input terminal 28 with its inverting input connected to DC output terminal 34 (ground) and its output connected to MOS transistor 26. Comparators 44 and 46 are both active circuits, and are powered by a feedback connection to the DC output terminal 32.

In another embodiment of the invention, shown in FIG. 3, a bridge rectifier circuit 14 includes comparator circuits 48 and 50, having their noninverting inputs connected to DC output terminal 34 (ground), their inverting inputs connected to AC input terminals 28 and 30, respectively, and their output terminals connected to MOS transistors 24 and 26, respectively, as shown in FIG. 3. Again, comparator circuits 48 and 50 are active circuits, powered by a feedback connection to the DC output terminal 32.

Figure 4:
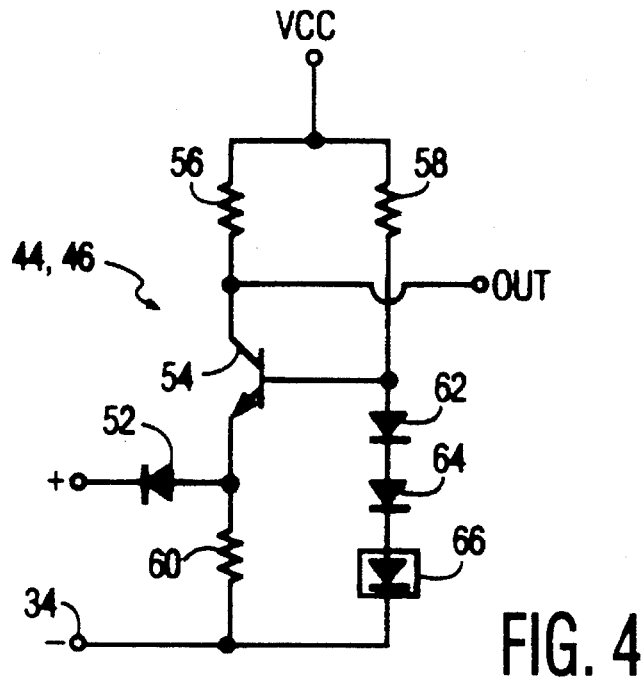
FIG. 4 shows a schematic diagram of a comparator circuit suitable for use in the bridge rectifier circuit of FIG. 2.
Figure 5:
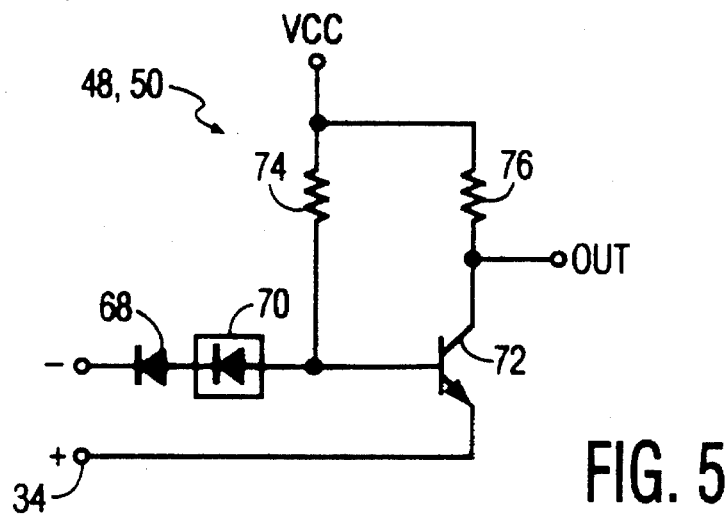
FIG. 5 shows a comparator circuit suitable for use in the bridge rectifier circuit of FIG. 3.
Figure 6:
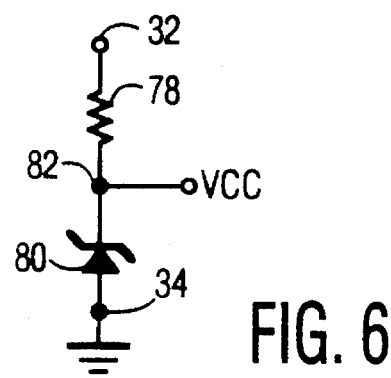
FIG. 6 shows a voltage regulator suitable for use in the bridge rectifier circuits of FIGS. 2 and 3.

While the comparator circuits shown in FIGS. 2 and 3 can take various forms, one advantageous circuit configuration for comparator circuits 44 and 46 is shown in FIG. 4, with an analogous circuit configuration for comparator circuits 48 and 50 being shown in FIG. 5.

FIG. 4 shows a single-stage positive gain comparator circuit that allows a high voltage to exist on the positive input terminal without breakdown due to the presence of an input diode 52. The comparator circuit additionally includes an npn bipolar transistor 54 connected in a common-base configuration and coupled between VCC and DC output terminal 34 (ground) by resistors 56, 58 and 60. Additionally, the base of transistor 54 is coupled to ground through diodes 62, 64 and (optionally) 66, with the circuit output being taken from the collector of transistor 54.

An analogous circuit configuration for use as comparator circuits 48 and 50 in FIG. 3 is shown in FIG. 5. In this circuit, a blocking diode 68 in series with (optional) diode 70 is used to block high positive voltages that may appear at the inverting input terminal of the comparator circuit, and an npn bipolar transistor 72 is connected in a single-stage negative gain comparator circuit coupled between VCC and DC output terminal 34 (ground) by resistors 74 and 76, with the output of the circuit being taken from the collector of transistor 72.

For use in bridge rectifiers circuits in relatively low-voltage applications, the terminal VCC of the comparator circuits of FIGS. 4 and 5 may be connected directly to the positive DC output terminal 32 in the circuits of FIG. 2 and 3. However, for high-voltage applications, it is necessary to provide a reduced, and preferably regulated, supply voltage VCC for the circuits of FIG. 4 and 5, and for this purpose a simple voltage regulator circuit such as that shown in FIG. 6 may be used. In this circuit, a resistor 78 and a zener diode 80 are connected in series between the DC output terminals 32 and 34, with the regulated output voltage VCC (typically in the range of 10 to 15 volts) being taken from the common junction 82 between these two components.

Referring back to FIG. 1 for an operational overview of the invention, the active control circuit 42 has control inputs coupled to AC input terminals 28 and 30 for sensing the state of the AC input voltage, and uses active control circuitry powered from the DC output terminals 32 and 34 to provide appropriate output signals coupled to the gates of MOS transistors 24 and 26 to control their states. In effect, the MOS transistors 24 and 26, under the control of active control circuit 42, act as relatively ideal diodes, with both lower on-resistance and faster switching times than either p-n junction diodes or MOS transistors controlled by a passive control circuit deriving its inputs from the AC input terminals.

More specifically, with reference to FIG. 2, the active control circuit may comprise a pair of comparators, each comparator having its inverting input connected to ground and its noninverting input cross-coupled to one of the AC input terminals 28, 30. In operation, when the voltage at AC input terminal 28 is greater than the threshold, comparator 46 will rapidly and fully turn on MOS transistor 26 by providing a positive output signal to the gate of this transistor. At the same time, the voltage on AC input terminal 30 will be less than the threshold, and comparator 44 will turn transistor 24 off by providing a low signal to its gate. When the polarity of the voltages at AC input terminals 28 and 30 are reversed, at a subsequent point in the sinusoidal AC input waveform, the states of MOS transistors 24 and 26 will likewise be reversed. Thus, each comparator-transistor pair (44, 24 and 46, 26) operates as a relatively ideal diode-bridge element, switching to the conductive or non-conductive state as would a conventional p-n junction diode, but with the lower on-resistance of an MOS transistor and the faster switching times resulting from the use of a processed activation signal from the comparator circuits, rather than the slowly-changing sinusoidal waveform present on the AC input terminals.

In the embodiment shown in FIG. 3, each of the comparators has its noninverting input grounded, and its inverting input coupled to the AC input terminal, which is also connected to the MOS transistor being controlled by that comparator. In this embodiment, a positive voltage on AC input terminal 28 will cause a low output voltage from the comparator 48 to appear on the gate of MOS transistor 24, thus turning that transistor off, while the corresponding negative voltage on AC input terminal 30 will cause the output of comparator 50 to go high, thus turning MOS transistor 26 on, with the states of both transistors changing when the polarity of the AC voltage appearing on terminals 28 and 30 reverses. Again, the comparator-transistor pairs operate as ideal diodes, switching from high conductivity to low conductivity at the appropriate times and providing lower on-resistance and faster switching characteristics than prior-art circuits.

An illustrative circuit suitable for use as a comparator circuit in FIG. 2 is shown in FIG. 4. Since the comparators 44 and 46 in FIG. 2 will receive relatively high positive input voltages on their noninverting terminals during a portion of the operating cycle (when the bridge is used in high-voltage applications) the noninverting input terminal of the comparator circuit of FIG. 4 is provided with a high-voltage blocking diode 52 that is reverse-biased for positive input voltages, thus protecting the remainder of the circuit from breakdown. Thus, for positive inputs to the noninverting input terminal, the output terminal OUT of the comparator will be high, while for negative inputs at the noninverting input terminal, current will flow through the base-emitter junction of transistor 54 and diode 52 to cause the voltage at output terminal OUT to assume a low state. If optional diode 66 is omitted from the circuit, the forward-voltage drops of diode 62 and 64 will cancel out the forward-voltage drops of the base-emitter voltage of transistor 54 plus the voltage drop of diode 52, thus resulting in a substantially zero threshold voltage. If desired, the diode 66 can be added to this circuit as shown in order to add an offset to the threshold voltage of the comparator, thus avoiding the possibility of simultaneously activating MOS transistors 24 and 26 when the AC input voltage at terminals 28 and 30 is close to 0.

For the bridge rectifier circuit shown in FIG. 3, a circuit such as that shown in FIG. 5 may be used for the comparators 48 and 50. In this application, the inverting input of the comparator may receive a high voltage in certain applications, and blocking diode 68 is provided to protect the rest of the circuit from damage under such conditions. In this circuit, a positive input at the negative (inverting) input terminal will cause the voltage at the base of transistor 72 to go high, thus turning this transistor on and causing the voltage at output terminal OUT to go low, while a low input at the inverting input will cause a low voltage to appear at the base of transistor 72, thus causing its output terminal OUT to assume the high state. If the optional diode 70 is omitted, the voltage drops across diode 68 and the base-emitter junction of transistor 72 will cancel out, thus resulting in a zero-threshold comparator circuit. If the optional diode 70 is included, however, a deliberate offset will be induced to prevent simultaneous activation of the MOS transistors 24 and 26 at the zero crossover point of the input voltage.

Finally, although the comparators shown in FIG. 2 and 3 are illustrated as having their positive power supply terminals connected directly to the positive DC output terminal 32, for high-voltage bridge rectifier circuits this voltage may be too high. In such cases, the positive power supply terminal VCC of the comparator circuits shown in FIGS. 4 and 5 can be connected instead to the terminal VCC of the simple voltage regulator circuit shown in FIG. 6, which provides a constant, regulated voltage VCC (typically in the range of 10 to 15 volts) at the junction 82 between resistor 78 and zener diode 80. This simple voltage regulator circuit serves to protect the components in the comparators as well as the gates of the MOS transistors from breakdown in high-voltage bridge rectifier circuit applications.

The invention thus provides a bridge rectifier circuit having active switches such as MOS transistors, in which an active control circuit is used for greater switching efficiency and to minimize power dissipation, heat generation, voltage drop and undesirable "glitches" in the output waveform, in a circuit which is relatively simple and compact in design, and relatively economical to manufacture. It is a particular advantage of the present invention that all of the circuits described can be fabricated in integrated circuit form, without the necessity for any discrete or external components.

While the invention has been particularly shown and described with reference to several preferred embodiments thereof, it will be understood by those skilled in the art that various changes in form and detail may be made without departing from the spirit and scope of the invention. Thus, for example, different circuit configurations can be used for the comparator circuits shown in FIGS. 4 and 5, and different forms of actively-controlled active switch bridge rectifier circuits, other than those shown in FIG. 2 and FIG. 3, may be employed. Finally, actively-controlled active switch circuits similar to those described may also be used to replace p-n junction diodes 20 and 22, so that all four elements in the bridge rectifier circuit will have active control and switching.

What is claimed is:

1. A bridge rectifier circuit comprising four rectifier elements in a bridge configuration having two AC input terminals and two DC output terminals, at least two of said rectifying elements comprising active switches, and an active control circuit for controlling the state of said active switches, said control circuit having control inputs coupled to said AC input terminals and control outputs coupled to said at least two active switches, and said control circuit being coupled to and powered from said DC output terminals.

2. A bridge rectifier circuit as in claim 1, wherein two of said rectifying elements comprise active switches, each active switch being coupled between one of said AC input terminals and that one of said two DC output terminals which is at a lower DC potential.

3. A bridge rectifier circuit as in claim 2, wherein said active switches comprise MOS transistors and said control outputs are coupled to the gates of said MOS transistor.

4. A bridge rectifier circuit as in claim 3, wherein said control circuit comprises a comparator circuit for sensing the level of at least one of said AC input terminals with respect to a reference voltage.

5. A bridge rectifier circuit as in claim 4, wherein said reference voltage is said lower DC potential.

6. A bridge rectifier circuit as in claim 4, wherein said comparator circuit comprises a bipolar transistor having a main current path coupled between said DC output terminals and a control electrode coupled to one of said control inputs by a diode.

7. A bridge rectifier circuit as in claim 6, further comprising a voltage regulator circuit for providing a regulated DC voltage derived from said DC output terminals to said comparator circuit.

* * * * *